United States Patent [19]

Eckert, Jr. et al.

[11] 3,849,632

[45] Nov. 19, 1974

[54] READING APPARATUS FOR OPTICAL BAR CODES

[75] Inventors: Alton B. Eckert, Jr., Norwalk; John H. Steinmetz, South Norwalk, both of Conn.

[73] Assignee: Pitney-Bowes, Inc., Stamford, Conn.

[22] Filed: May 4, 1973

[21] Appl. No.: 357,353

Related U.S. Application Data

[63] Continuation of Ser. No. 264,178, June 19, 1972, abandoned.

[52] U.S. Cl. .......................... 235/61.11 E, 250/566
[51] Int. Cl. .......................... G06k 7/10, G08c 9/06
[58] Field of Search....... 235/61.11 E; 250/555, 566

[56] References Cited

UNITED STATES PATENTS

| | | | |
|---|---|---|---|
| 3,309,667 | 3/1967 | Feissel et al. | 235/61.11 E |
| 3,543,007 | 11/1970 | Brinker et al. | 235/61.11 E |
| 3,543,241 | 11/1970 | Leuck | 235/61.11 E |
| 3,581,067 | 5/1971 | Willits et al. | 235/92 V |
| 3,708,748 | 1/1973 | Nassimbene | 340/347 DD |

*Primary Examiner*—Daryl W. Cook
*Attorney, Agent, or Firm*—William D. Soltow, Jr.; Albert W. Scribner; Peter Vrahotes

[57] ABSTRACT

Reading apparatus for optical, linear bar codes having variable width encoded bar and space code elements includes a photodetector for developing a video signal which is fed to an analog to digital converter. This converter, which consists of a dual level clamping circuit and a triggering circuit, operates on each video signal transition of a predetermined magnitude, corresponding to scanning across the edges of the code elements, to develop a succession of alternating logic signal pulses and pulse intervals of widths respectively proportional to the widths of the successive code elements; the logic signal pulses being supplied to processing logic circuitry for decoding the bar code.

6 Claims, 3 Drawing Figures

READING APPARATUS FOR OPTICAL BAR CODES

This is a continuation of application Ser. No. 264,178, filed June 19, 1972, now abandoned.

BACKGROUND OF THE INVENTION

The present invention particular application to point-of-sale systems and equipment, wherein the acquisition of data involves, at least in part, the machine reading of coded tickets, tags and/or labels respecting the individual sales being consumated at a checkout counter, or the like. The current practice, of which everyone is familiar, requires that a clerk read the price and possibly the item or department number printed on a ticket associated with each item of merchandise and then key this information into a cash register or a terminal of a point-of-sale data acquisition system, such as disclosed in U.S. Pat. No. 3,596,256. This data entry procedure can be quite time consuming, particularly when the clerk is inexperienced. Moreover, the keyboard entry of data is conductive to error, particularly when the clerk is rushed. So called, "under-rings" are quite damaging in volume merchandising situations, such as supermarkets, since the profit margin on individual items is typically quite low. On the other hand, so called "over-rings" can be equally as damaging from a customer relations standpoint.

An overall solution to this problem is to provide the sales data on the tickets associated with each item of merchandise in machine readable language and an appropriate reader operated by the clerk to scan the data pursuant to its entry into a cash register or data acquisition system. Such a reader, for example a hand-held wand, can be drawn across an encoded ticket by a relatively inexperienced clerk to enter the sales data in considerably less time than a highly skilled clerk can manually key in the sales data. Moreover, assuming a true read of the ticket, the transfer of sales data from the tickets to a cash register, previously effected by human intervention, is achieved without error.

In view of the attractiveness of this form of data entry in point-of-sale situations, considerable research effort has been and is being expended in developing machine readable code formats, means for applying the encoded sales data to tickets, etc., and compatible readers for interpretation of the data. A particularly attractive encoding format, due to its susceptibility of being inexpensively and rapidly printed on the tickets and due to its inherently high information packing density, is an optical two-color linear bar code wherein the data bits are manifested in the selective widths of both the bar and space code elements. Such a bar code format is disclosed in the copending Eckert, Jr., et al. application Ser. No. 130,600, filed Apr. 2, 1971 and assigned to the assignee of the instant application.

To read a bar code of this type, either by scanning the tickets with a hand-held wand or by moving the tickets past a stationary reader, a light signal modulated by the succession of code elements is converted into a corresponding video signal by a suitable transducing element, such as a photodiode, etc. Unfortunately, in practice, this video signal is frequently difficult to interpret due to spurious variations therein caused by uneven bar code printing, variations in lighting, variations in background, dirt and ink marks, etc. Inasmuch as the widths of the code elements convey the information, it is imperative that their leading and trailing edges be precisely recognized from the video signal. Moreover, this recognition must be achieved despite variations in the scanning rate inherent in reading the bar coded tickets with a hand-held wand.

SUMMARY OF THE INVENTION

The present invention relates to optical reading apparatus for processing a video signal derived from scanning a linear bar code having variable width encoded bar and space code elements. More particularly, the invention provides reliable and inexpensive circuitry for detecting transitions in the video signal corresponding to scanning across the transitions between code elements and for utilizing these transitions as a basis for digitizing the video signal into a logic signal form conducive to processing by digital logic circuitry.

Basically, the apparatus of the invention comprises a photodetector for converting the light signal received from the bar coded ticket, tag or label into a corresponding video signal. This video signal is filtered and suitably amplified, whereupon it is supplied to a dual level clamping circuit. This clamping circuit includes a capacitor having one terminal connected to receive the amplified video signal. The other capacitor terminal is connected to the input of an amplifier having negative or inverting gain and also via oppositely polled diodes to opposite polarity clamping level establishing voltages referenced to the output of the amplifier. The voltage at this other capacitor terminal follows each amplified signal transition corresponding to a bar code element transition, i.e., from bar to space and space to bar as does the inverted amplifier output voltage. When the video input signal voltage transition in either the positive or negative direction reaches a predetermined magnitude relative to one of the clamping voltages sufficient to drive the associated diode into conduction, clamping occurs. There is thus provided at this other capacitor terminal an alternating voltage signal clamped symetrically about zero volts and an amplified but complimentary, clamped alternating signal voltage at the amplifier output.

This alternating voltage signal is supplied to a triggering circuit which responds to each transition thereof between positive and negative clamping voltage levels exceeding a predetermined magnitude by switching its output between high and low logic signal levels. The triggering circuit output is thus in the form of a succession of digitized, alternating logic signal pulses and pulse intervals of respective widths proportional to the corresponding succession of scanned bar code elements.

Processing logic, such as disclosed in copending application Ser. No. 157,870, filed June 29, 1971 and assigned to Monarch Marking Systems, a wholly owned subsidiary of the instant assignee, is then utilized to process the logic signal pulses pursuant to assigning the appropriate binary code significance to each bar code element.

The invention accordingly comprises the features of construction, combination of elements, an arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

DETAILED DESCRIPTION

Figure 1:
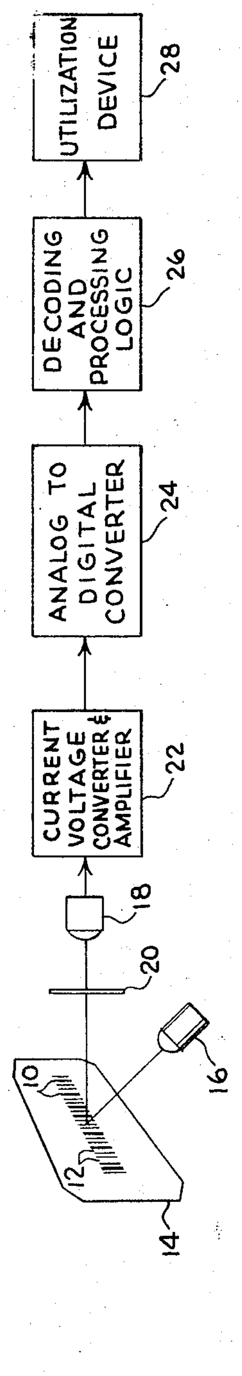
FIG. 1 is an overall block diagram of the invention as incorporated in a point-of-sale application.

Referring now to the drawings, the optical code reading apparatus of the invention, as generally illustrated in FIG. 1, is particularly adapted to reading a linear bar code having variable width bar 10 and space 12 code elements printed or otherwise applied to a ticket, tag, label or the like 14. Such a linear bar code, wherein the wide bars and spaces represent one binary significance and the narrow bars and spaces represent the other binary significance, is disclosed in the above noted Eckert, Jr., et al. application, Ser. No. 130,600.

A light source 16, included in the reading apparatus, directs a beam of light onto the bar code during relative, scanning movement between the ticket 14 and the reading apparatus. That is, light source 16 may be incorporated in a hand-held wand which is swept over the linear bar code while the ticket 14 is stationary. Alternatively, the ticket may be fed past a stationary reading apparatus to scan the linear bar code. In either application, reflected images of the individual code elements 10 and 12 are focused on a suitable photodetector 18, such as a photodiode, phototransitor, etc., through a shaped aperture formed in a mask 20. While not illustrated in FIG. 1, it will be appreciated that an appropriate lens system may be used to focus the individual code element images on the photodetector 18.

The response of the photodetector 18 to the analog light signal incident thereon, as modulated by the individual code elements 10 and 12 of the bar code, is in the form of an analog video current signal which is supplied to a current-voltage coverter and amplifier network 22. This network functions to convert the video current signal at its input to a corresponding video voltage signal with appropriate amplification.

It will be appreciated that a photodetector may be adapted to respond in the form of a video signal in which case current to voltage conversion is unnecessary. The amplified video signal at the output of network 22 is supplied to an analog to digital converter 24 whose function, in accordance with the present invention, is to respond to each positive-going and negative-going transition of the video voltage signal corresponding to the leading and trailing edges of the scanned bar code elements in order to develop at its output digitized logic signal pulses having proportionately time-spaced leading and trailing edges. Accordingly, the pulse widths of the succession of logic signal pulses at the output of converter 24 correspond to the respective widths of the successively scanned bar code elements. This succession of logic signal pulses is supplied to suitable decoding and processing logic 26, such as disclosed in the above-noted copending application, Ser. No. 157,870, for assigning the appropriate binary code significance to the individual logic pulse inputs on the basis of their pulse widths. The now binary encoded data bits making up the data characters included in the bar coded message carried by ticket 14 are supplied as a data entry to a utilization device 28, such as a point-of-sale acquisition system.

It will be appreciated that one of the factors affecting the widths of the individual logic signal pulses at the output of converter 24 is the rate at which the bar code is scanned, and that variations in the scan rate will cause corresponding variations in the apparent widths of the bar code elements. However, the decoding and processing logic 26 disclosed in application Ser. No. 157,870 performs the decoding function on the basis of the relative widths of the logic signal pulse inputs, not their absolute pulse widths, and on a character by character basis. Thus, drastic variations in the scan rate over a character length, which may be on the order of 0.2 inches or less, are highly unlikely. Consequently, it may be validly assumed that the scanning velocity over a discrete character length will affect the apparent widths of the individual code elements of the character uniformily, and can therefore be readily factored out in the decoding logic circuitry 26.

Figure 2:
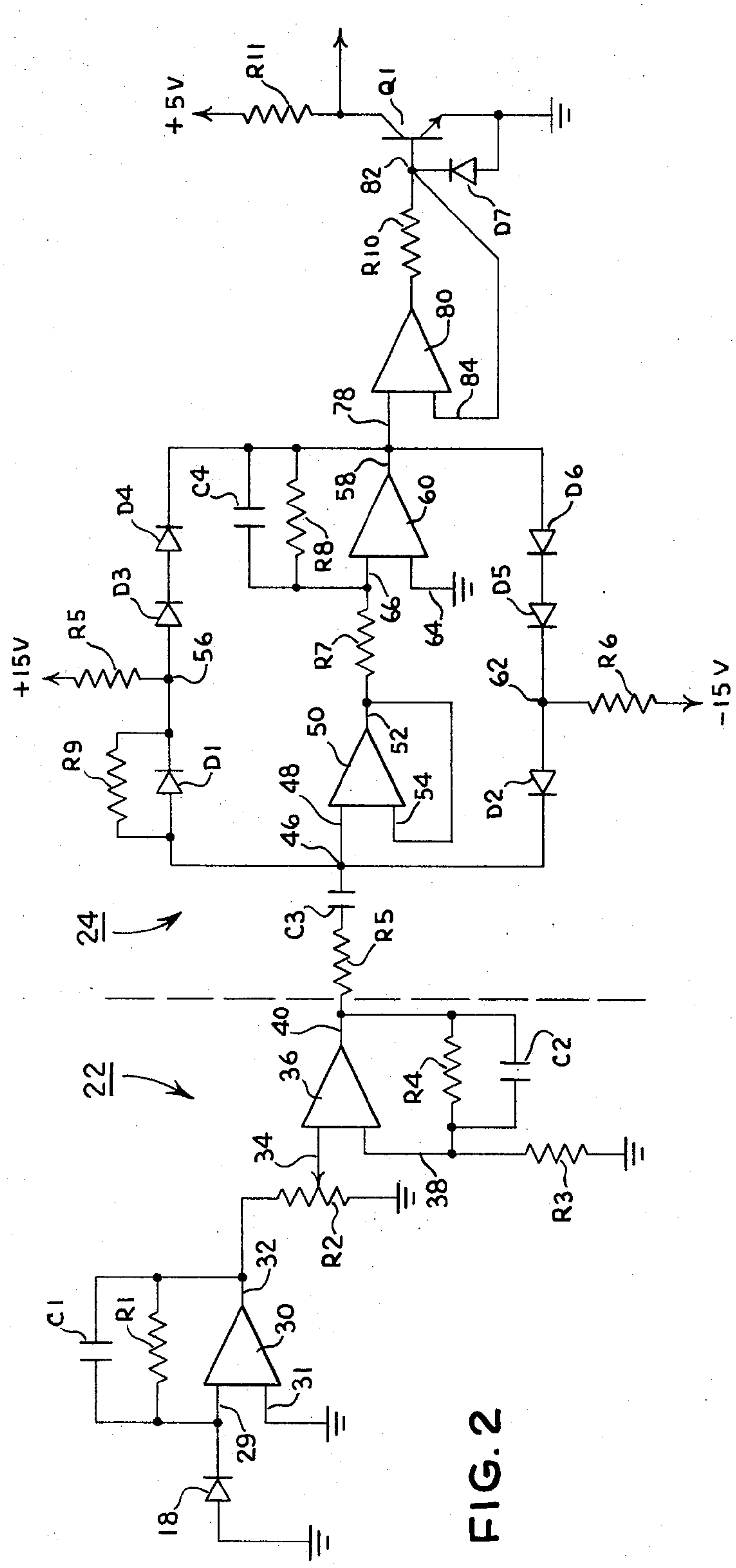
FIG. 2 is a detailed circuit schematic diagram of a portion of the block diagram of FIG. 1.

In accordance with the perferred embodiment of the present invention, network 22 and converter 24 are constructed in the manner illustrated in FIG. 2. Specifically, photodetector 18 in the form of a photodiode, has its anode grounded and its cathode connected as one input 29 to an operational amplifier 30. Photodiode 188 serves as a current source for generating an analog video signal directly proportional to the analog light signal incident thereon from the ticket 14. Operational amplifier 30, functioning as a current to voltage converter, has its other input 31 grounded and an output resistor R1 connected between its input 29 and its output 32. Capacitor C1, shunning resistor R1, stabilizes amplifier 30 and also serves the important function of filtering out spurious high frequency signals arising from minute dirt and ink marks in the bar code area of ticket 14. The video signal voltage output from amplifier 30, corresponding to the video current signal input, is supplied to a gain control potentiometer R2. A portion of this voltage signal is tapped off and applied to one input 34 of an operational amplifier 36. The other input 38 of this amplifier is connected to ground through a resistor R3 and to its output 40 through a resistor R4. Resistors R3 and R4 determine the non-inverting gain of operational amplifier 36, while capacitor C2 shunting resistor R4 provides high frequency noise filtering. The circuitry thus far described corresponds to the current-voltage converter and amplifier network 22 of FIG. 1.

Figure 3:
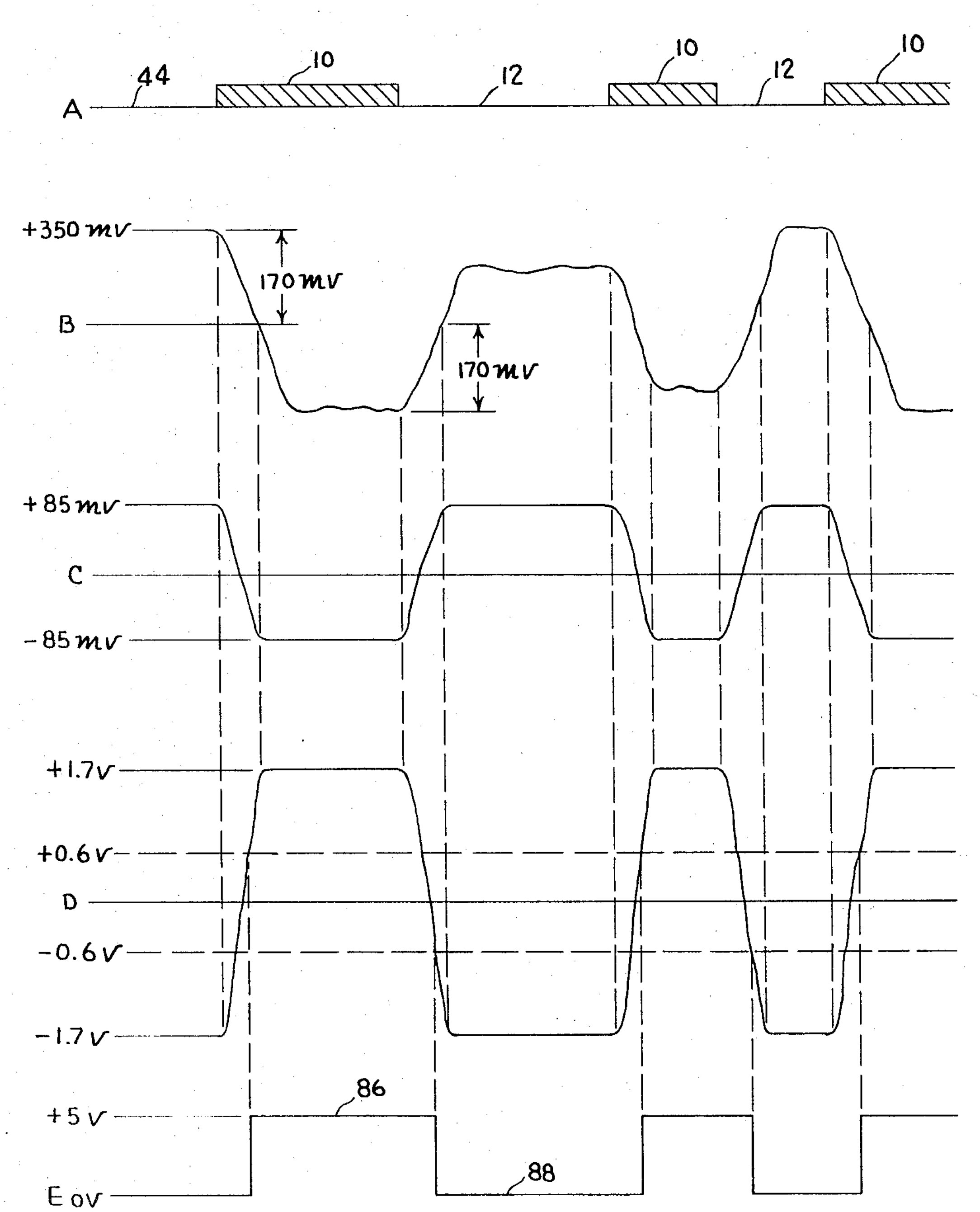
FIG. 3 consist of a series of timing diagrams illustrating the operation of the circuitry of FIG. 2.

The amplified video voltage signal appearing at the output 40 of operational amplifier 36 is approximated by waveform B illustrated in FIG. 3. As viewed in conjunction with the bar code layout A in FIG. 3 the video signal is high during the scanning of ticket background areas, illustrated at 44, and the space code elements 12 and drops to a low level during the scanning of the bar code elements 10. It will be noted from waveform B that the levels assumed by the video signal during the scanning of background areas 44 and space code elements 12 is not necessarily constant due to degradation in its reflectance characteristics resulting from dirt, etc. By the same token, the low levels assumed by the video signal during the scanning of bar code elements 10 is not necessarily constant due to uneven printing, etc. As will be seen, these level variations do not affect the operation of converter 24.

Returning to FIG. 2, the amplified video signal voltage is coupled through an AC limiting resistor R5 and a series capacitor C3 to a junction 46 which is common to one input 48 of an operational amplifier 50, which preferably has a high input impedance, such as a FET input, to minimize the load on capacitor C3. The output 52 of this amplifier is connected in common with its other input 54 such as to operate strictly as a voltage follower. While not absolutely essential, amplifier 50 is including to improve the low frequency response of converter 24.

Still referring to FIG. 2, junction 46 is also connected through a diode D1 and resistor R5 to a positive voltage supply of suitable magnitude, for example +15 volts. Junction 46 is also connected through a diode D2 and resistor R6 to a negative voltage supply of −15 volts. Junction 56 between resistor R5 and diode D1 is referenced to the output 58 of an operational amplifier 60 through a pair of forwardly biased diodes D3 and D4. Similarly, junction 62 between resistor R6 and diode D2 is referenced to amplifier output 58 through a pair of forwardly biased diodes D5 and D6. Input 64 of operational amplifier 60 is grounded, while its other input 66 is connected through resistor R7 to the output 52 of operational amplifier 50 and through resistor R8 to output 58. The values of resistors R7 and R8 are selected to provide amplifier 60 with an inverting or negative gain of twenty, for example. Capacitor C4 connected across resistor R8 provides high frequency rolloff. Resistor R9 connected in shunt with diode D1 is preferably included so as to force converter 24 to a predetermined quiescent output signal condition.

As will be seen from the following description of operation, the converter circuitry thus far described functions as a dual level clamping circuit responding only to transitional changes of the amplified video signal (curve B,) between its high and low levels.

In the absence of a video input signal, capacitor C3 is charged from the plus reference voltage supply through resistor R9 shunting diode D1 to develop a positive voltage at junction 46. This positive input voltage is amplified by amplifier 60 to develop a negative voltage at its output 58. The clamping level voltage at junction 56 is pulled downwardly by this negative output voltage since it is referenced thereto through the substantially constant forward voltage drops across the two series connected diodes D3 and D4. For purposes of the present description, the forward voltage drop for each of these diodes, as well as diodes D5 and D6, is assumed to be 0.6 volts. Thus, the clamping voltage at junction 56 is always 1.2 volts above the voltage at amplifier output 58. Similarly the clamping voltage at junction 62 is always 1.6 volts below the amplifier output voltage.

When capacitor C3 charges to the point where the voltage at junction 46 slightly exceeds, for example +57 milivolts, the voltage at amplifier output 58 has dropped to −1.14 volts, assuming a negative gain of twenty. The clamping voltage at junction 56 is thus pulled down to slightly above +57 milivolts, thereby producing a zero voltage drop across resistor R9 at which point capacitor C3 stops charging. As a consequence, the voltages at junction 46 and amplifier output 58 settle to approximately +57 milivolts and −1.14 volts, respectfully, in the absence of a video input signal by virtue of resistor R9. It is thus seen that this resistor has the effect of establishing a predetermined quiescent signal condition for converter 24, which in illustrated embodiment corresponds to the signal condition when the reading apparatus sees white. If desired, the resistor R9 can be placed across diode D2, in which case the quiescent signal condition is such that junction 46 settles to −57 milivolts and amplifier output 58 settles to +1.14 volts, corresponding to the signal condition when the reading apparatus sees black. It will be appreciated that this resistor R9 should be sufficiently large so as not to unduly limit low frequency response. Capacitor C3 should also be reasonably large in value for good low frequency response. It will be appreciated that both diodes D1 and D2 are cut off during this quiescent state.

When light from the ticket background area 44 (FIG. 3) preceding the first bar 10 is incident on photocell 18, the amplified video signal voltage at the output 40 of amplifier 36 rises to a high level of, for example, +350 milivolts (waveform B). With the application of this high signal voltage to capacitor C3 the voltage at junction 46 follows the signal voltage upwardly from +57 to +85 milivolts where it is clamped by diode D1 for reasons to be described. Capacitor C3 rapidly charges through diode D1 to a voltage equal to the difference between the input signal voltage and the +85 milivolts at junction 46. If the reading apparatus pauses on the background area 44, capacitor C3 discharges through resistor R9, cutting off diode D1, and the converter settles to its quiescent state. It will be seen that these positive voltage fluctions between +57 and +85 milivolts have no affect on the converter output signal level. It will be assumed that the reading apparatus does not pause on the background area, but moves forthwith to the first bar 10, and the voltage at junction 46 remains clamped at +85 milivolts, as seen in waveform C of FIG. 3, rather than falling off to the quiescent state level of +57 milivolts.

Upon encountering the leading edge of the first bar 10, the video signal voltage (waveform B, FIG. 3) begins to fall off. Diode D1 cuts off depriving capacitor C3 of a low impedence circuit path through which it can discharge. It therefore retains its existing charge, and the voltage at junction 46 follows the video signal voltage (waveform C, FIG. 3). The voltage at output 58 of amplifier 60 swings positively with a gain of twenty (waveform D, FIG. 3). When the analog signal voltage goes through a negative-going transition of 170 milivolts, the voltage at junction 46 has fallen to −85 milivolts and the voltage at amplifier output 58 has risen to +1.7 volts. The clamping voltage at junction 62 follows this output voltage swing, but is separated therefrom by the sum of the forward voltage drops across diodes D5 and D6. Consequently the clamping voltage at junction 62 goes to +0.5 volts when the output voltage rises to +1.7 volts. At this point, the forward voltage drop across diode D2 is on the order of 0.6 volts which is sufficient to turn this diode on, thereby clamping junction 46 and amplifier output 58 to −85 milivolts and +1.7 volts, respectively. The continuing negative-going swing of the video signal voltage is absorbed in capacitor C3 by virtue of the now conducting state of diode D2.

Upon encountering the transition between the first bar 10 and the first space 12, (layout A, FIG. 3), the video signal voltage begins to rise. As seen in FIG. 3, the voltage at junction 46 (waveform C) also begins to rise, causing the voltage at amplifier output 58 (waveform D) to swing downwardly in the negative direction. Upon initiation of this action, diode D2 is no longer forward biased and therefore cuts off. Capacitor C3 is thus unable to alter its charge accumulated during the scanning of the first bar 10, and the voltage at junction 46 follows the rise in the video signal voltage at junction 40 (waveform B).

When the voltages at amplifier output 40 and junction 46 swing through a positive-going 170 milivolt transition, the voltage at amplifier output 58 has swung from +1.7 volts to −1.7 volts. The voltage at junction 56, separated from the amplifier output voltage by the forward voltage drops across diodes D3 and D4, assumes a level of −0.5 volts. Consequently diode D1 now has a forward drop across it of approximately 0.6 volts, sufficient to turn it on, thereby clamping junction 46 and amplifier output 58 to +85 milivolts and −1.7 volts, respectively. Capacitor C3 absorbs the remainder of the positive-going swing of the video signal voltage since diode D1 is conducting. As can be seen from FIG. 3, the operation of this dual level clamping circuit merely repeats itself in processing the video signal voltage derived from the scanning of the remaining bars and spaces of the bar code printed on ticket 14. It should be understood that these voltage values are indicated solely for purposes of illustration, and should not be interpreted as limiting the invention.

From the foregoing operating description it is seen that this dual level clamping circuit operates on the transitions of the video signal voltage between the levels it achieves during the scanning of the alternating bars and spaces, but is completely insensitive to the absolute values of the achieved voltage levels. Consequently, degradation in the light reflectance characteristics of the individual bars and spaces, caused by uneven printing, dirt, etc., affecting the magnitudes of these upper and lower voltage levels is effectively ignored.

It is also important to note, in the context of the present invention, that this dual level clamping circuit is capable of handling very low signal levels. This is achieved by referencing the clamping voltages to the amplified signal voltage appearing at output 58. This has the effect of utilizing the negative gain of amplifier 60 to assist the video signal voltage input at junction 46 in achieving the forward voltage drops across diodes D1 and D2 necessary to turn them to achieve clamping action. It will be appreciated that if junctions 56 and 42 were connected to ground rather than referenced to the amplifier output voltage, the video signal voltage at junction 46 would have to be at least 1.2 volts peak to peak, i.e., ±0.6 volts, in order to be capable of turning diodes D1 and D2 on. To achieve video signal voltage inputs of this magnitude would impose excessively high gain requirements on amplifier 36. Such high gain requirements necessitate AC coupling which adds undesirable under and over shoots to the signal due to the interaction of the time constants of such a coupling capacitor and capacitor C3.

Returning to FIG. 2, the amplified, clamped alternating signal voltage appearing at output 58 is applied as one input 78 to an operational amplifier 80, which functions as a comparator in a triggering circuit including a transistor Q1. The output of this amplifier is connected through a resistor R10 to the base of transitor Q1, whose collector is connected through a resistor R11 to a +5 volt supply and emitter is connected to ground. The base and emitter of transitor Q1 are connected together through a diode D7, while junction 82 between this diode and resistor R10 is returned as the second input 84 to amplifier 80. The output of converter 24, illustrated by waveform E in FIG. 3, is taken from the collector of transitor Q1 for application to the decoding and processing logic 26 of FIG. 1.

When light from the background area 44 preceding the first bar 10 is incident on photodiode 18, the voltage at amplifier output 58 connected to input 78 of comparator amplifier 80 is sitting at −1.7 volts (waveform D, FIG. 3). The output of comparator amplifier 80 goes positive turning transitor Q1 on. As a consequence, the converter logic signal voltage at the collector of transitor Q1 is sitting at approximately ground potential as seen by waveform E in FIG. 3. At this time the voltage at junction 82, determined by the forward voltage drop across the base emitter junction of transitor Q1 is assumed to be for the purposes of the present description +0.6 volts, which is returned to the other input 84 of comparator amplifier 80. When the signal voltage at its other input 78, in swinging positively from −1.7 volts toward +1.7 volts during the scanning of the first bar 10, rises above +0.6 volts, the output of this comparator amplifier goes negative, thereby abruptly driving transitor Q1 into cut-off. As seen in FIG. 3, the output voltage of the converter 24 at the collector of transitor Q1 immediately switches from approximately ground potential to +5 volts. At this point, the voltage at junction 32 is held to approximately −0.6 volts, corresponding to the forward voltage drop across diode D7 selected to match the base emitter junction voltage of transitor Q1. This −0.6 volts is returned to input 84 of comparator amplifier 80.

Now, when the transition is being made from the first bar 10 to the first space 12, the voltage at amplifier input 78 connected to the swings negatively from +1.7 volts toward −1.7 volts. At the instant this voltage goes more negative than the −0.6 volts at input 84, the amplifier output again goes positve to drive transitor Q1 into conduction. The logic signal taken from the collector of transitor Q1 thus switches from +5 volts to ground as seen in FIG. 3. The ±0.6 volt threshold levels are provided to insure good noise imunity and ease of circuit implementation.

From the foregoing description, it is seen that the digitized logic signal output from converter 24 (waveform E, FIG. 3) is in the form of a succession of alternating pulses and pulse intervals whose respective widths correspond to the widths of the corresponding succession of scanned code elements. That is, logic signal pulse 86 has a width substantially corresponding to the width of the initial scanned bar 10 (FIG. 3). Similarly, the pulse interval 88 following pulse 86 has a width substantially corresponding to the initial space 12. It will be observed that the leading edge of logic signal pulse 86 is somewhat delayed from the leading edge of the initial bar 10, however the trailing edge of logic signal pulse is similarly delayed from the trailing edge of the initial bar 10, thus preserving the width correspondence therebetween. The extent of these delays is largely determined by the initial slopes of the amplified video signal voltage (waveform D) in swinging between its upper and lower levels, which in turn are dependent upon the rate in which the bar code is scanned, the edge definition of the code elements and the gain of amplifier 36. However, since it can be assumed that the scanning rate does not vary appreciably over a character length and by use of appropriate printing techniques the edge definition of the code elements can be maintained substantially constant, the binary significances of the individual code elements can be readily interpreted from the widths of the logic signal pulses and pulse intervals developed at the output of converter 24.

While the disclosed embodiment of the invention utilized forward biased diodes to reference the clamping voltage levels at junctions 56 and 62 to the amplified signal voltage at the output of amplifier 60 (FIG. 2), it will be understood that Zener diodes, resistive voltage divider networks, and even actual power supplies or batteries may be utilized to the same end. The advantage of forward biased diodes is that, within limits, their forward voltage drops are reasonably constant with variations in current. The absolute magnitude of the voltage clamping levels should be reasonably high in order to provide adequate noise suppression and also to minimize the effects on the voltage clamping levels of minor variations in the diode forward voltage drops. Moreover, factors causing variations in the diode forward voltage drops also correspondingly affect the junction forward voltage drops establishing the threshold levels for comparator amplifier 80, thus affording a measure of compensation.

It will thus be seen that the objects of the invention made apparent from the foregoing description are efficiently attained and, since certain changes may be made in the above construction without departing from the scope of the invention, it is intended that all matter contained in the above description or shown in the accompanying drawings shall be interpreted as illustrative and not in a limiting sense.

Having described the invention, what is claimed as new and desired to be secured by Letters Patent is:

1. An apparatus for extracting width information from a linear bar code having variable width encoded elements and for impressing said information upon a width-modulated two-state signal, said apparatus comprising:

scanning means for scanning said linear bar code along a path which traverses said bar code and for generating a video signal whose potential varies in accordance with the varying characteristics of the elements along the path;

a capacitive element having a first terminal to which said video signal is applied and also having a second terminal at which a clamped signal appears;

means for establishing a first clamping potential level at a first node and also a second clamping potential level at a second node which second clamping potential level is below the potential of said first clamping potential level, said means for establishing including means for maintaining a predetermined non-zero fixed-potential magnitude between said nodes;

first clamping means connecting to said capacitive element second terminal for preventing the potential of said capacitive element second terminal from rising above said first clamping potential level;

second clamping means connected to said capacitive element second terminal for preventing the potential of said capacitive element second terminal from falling below said second clamping potential level; and a triggering circuit having an input connecting to said clamped signal, having an output at which the width-modulated two-state signal appears, and having the following trigger characteristic when the potential of said capacitive element second terminal swings positive from a level at or near said second clamping potential level, said two-state signal remains in a first state until the potential of said capacitive element second terminal swings more than half-way from said second clamping potential level towards said first clamping potential level, and then said two-state signal enters its second state, and when the potential of said capacitive element second terminal swings negative from a level at or near said first clamping potential level, said two-state signal remains in its second state until the potential of said capacitive element second terminal swings more than half-way from said first clamping potential level towards said second clamping potential level, and then said two-state signal enters its first state.

2. An apparatus for extracting width information from a linear bar code having variable width encoded elements and for impressing said information upon a width-modulated two-state signal, said apparatus comprising:

scanning means for scanning said linear bar code along a path which traverses said bar code and for generating a video signal whose potential varies in accordance with the varying characteristics of the elements along the path;

a capacitive element having a first terminal to which said video signal is applied and also having a second terminal at which a clamped signal appears;

first clamping means connecting to said capacitive element second terminal for preventing the potential of said capacitive element second terminal from rising above a first clamping potential level;

second clamping means connected to said capacitive element second terminal for preventing the potential of said capacitive element second terminal from falling below a second clamping potential that is below the level of said first clamping potential; and a triggering circuit having an input connecting to said clamped signal, having an output at which the width-modulated two-state signal appears, which triggering circuit comprises an amplifier having a signal input connecting to said clamped signal, having an output at which the width-modulated two-state signal appears, and having a non-inverting input, said triggering circuit also including resistive elements connecting said non-inverting input to said output and also to a fixed-reference potential, wherein the ohmic values of the resistive elements and the voltage of the reference potential are selected to give the following trigger characteristic when the potential of said capacitive element second terminal swings positive from a level at or near said second clamping potential level, said two-state signal remains in a first state until the potential of said capacitive element second terminal swings more than half-way from said second clamping potential level towards said first clamping potential level, and then said two-state signal enters its second state, and when the potential of said capacitive element second terminal swings negative from a level at or near said first clamping potential level, said two-state signal remains in its second state until the potential of said capacitive element second terminal swings more than half-way from said first clamping potential level towards said second clamping potential level, and then said two-state signal enters its first state.

3. An apparatus for extracting width information from a linear bar code having variable width-coded elements and for impressing said information upon a width-modulated two-state signal, said apparatus comprising:

scanning means for scanning said linear bar code along a path which traverses said bar code and for generating a video signal whose potential varies in accordance with the varying characteristics of the elements along the path;

a capacitive element having a first terminal to which said video signal is applied and also having a second terminal at which a clamped signal appears;

first clamping means connecting to said capacitive element second terminal for preventing the potential of said capacitive element second terminal from rising above a first clamping potential level, said first clamping means including a first diode having an anode terminal connecting to said capacitive element second terminal and having a cathode terminal connecting to at least one other element of said first clamping means;

second clamping means connecting to said capacitive element second terminal for preventing the potential of said capacitive element second terminal from falling below a second clamping potential level that is below the level of said first clamping potential level, said second clamping means including a second diode having a cathode terminal connecting to said capacitive element second terminal and having an anode terminal connecting to at least one other element of said second clamping means; and a triggering circuit having an input connecting to said clamped signal, having an output at which the width-modulated two-state signal appears, and having the following trigger characteristic when the potential of said capacitive element second terminal swings positive from a level at or near said second clamping potential level, said two-state signal remains in a first state until the potential of said capacitive element second terminal swings more than half-way from said second clamping potential level towards said first clamping potential level, and then said two-state signal enters its second state, and when the potential of said capacitive element second terminal swings negative from a level at or near said first clamping potential level, said two-state signal remains in its second state until the potential of said capacitive element second terminal swings more than half-way from said first clamping potential level towards said second clamping potential level, and then said two-state signal enters its first state.

4. An apparatus in accordance with claim 3 which further includes a resistive element connecting said capacitive element second terminal to a source of biasing potential and thus arranged to bias said two-state signal into a predetermined state at times when no meaningful scanning is in progress.

5. An apparatus in accordance with claim 3 which includes a linear, signal-inverting amplifier having an input connecting to said capacitive element second terminal, having an output connected to the input of said trigger circuit, and arranged to linearly amplify said clamped signal; which also includes first and second constant voltage elements each having first and second terminals and each including means for maintaining a relatively constant potential difference between the constant voltage element terminals; wherein the first clamping means, in addition to said first diode, comprises said first constant voltage element having its first terminal connected to the cathode of said first diode and having its second terminal connected to the output of said signal-inverting amplifier; and wherein the second clamping means, in addition to said second diode, comprises said second constant voltage element having its first terminal connected to the anode of said second diode and having its second terminal connected to the output of said signal-inverting amplifier.

6. An apparatus in accordance with claim 5 wherein said potential reference elements each comprise a string of at least one forwardly-biased diode and bias-current supplying means connecting to said diodes for keeping them forward biased.

* * * * *